United States Patent [19]

Graniero et al.

[11] 4,383,362
[45] May 17, 1983

[54] APPARATUS FOR OPENING AND CLOSING THE CLAMPING MEMBERS OF A HANGER

[76] Inventors: Ronald S. Graniero, 1090 Ocean Ave., Elberon, N.J. 07740; John S. Truglia, 55 Wittenberg Ct., Oceanport, N.J. 07757

[21] Appl. No.: 241,225

[22] Filed: Mar. 6, 1981

[51] Int. Cl.³ .............................................. B23P 9/00
[52] U.S. Cl. ..................................................... 29/822
[58] Field of Search ....................... 29/235, 281.1, 283, 29/239, 446, 449, 437, 706, 717, 809, 822; 223/91, 95, 96

[56] References Cited

U.S. PATENT DOCUMENTS

| | | | |
|---|---|---|---|
| 3,824,671 | 7/1974 | Watkin | 29/809 |
| 3,859,710 | 1/1975 | Batts et al. | 29/235 |
| 4,261,098 | 4/1981 | Lincoln | 29/809 |

Primary Examiner—Ervin M. Combs
Assistant Examiner—Steven E. Nichols
Attorney, Agent, or Firm—R. Gale Rhodes, Jr.

[57] ABSTRACT

This invention selectively opens and closes the paired clamping members of a flexible skirt hanger by imparting predetermined forces to predetermined parts of said hanger in a predetermined manner. The hanger is held at a work station in a frame during a predetermined work operation which causes said forces to be applied. A pneumatically extended rod causes one of said paired clamping members to move in a predetermined rotational direction while a portion of said frame limits rotations of the other of said clamping members in said predetermined rotational direction, thereby effectively imparting a force to said other clamping member causing it to move in a direction opposite said predetermined rotational direction. The opposite rotational motion of each of said clamping members causes them to open to receive a garment therebetween. Means are provided to close said clamping members on said garment by removing said forces and enabling said clamping members to tend to resume their equilibrium position. The invention also comprises means for automatically feeding one hanger at a time into said work station.

5 Claims, 10 Drawing Figures

APPARATUS FOR OPENING AND CLOSING THE CLAMPING MEMBERS OF A HANGER

BACKGROUND OF THE INVENTION

1. Field of the Invention

This invention relates generally to mechanical devices for use with hangers provided with clamping members. More specifically, the invention relates to an apparatus for automatically opening and closing the clamping members of flexible skirt hangers.

2. Description of the Prior Art

Garment manufacturers have for many years utilized flexible or pliable clothing hangers to hang clothes after manufacture, and during shipment to customers. The significant variety of hangers available in the prior art may be characterized as either clamping or non-clamping hangers.

Clamping hangers are those provided with means thereon for actively clamping or gripping clothing hung on the hanger. Clamping hangers, as the term is used herein, generally incorporate two clamping members which are normally in equilibrium in a closed position and must be separated or opened from said closed position to enable a garment (or garments) to be inserted between the clamping members which are then allowed to resume, or tend to resume their equilibrium position.

As is well known to those skilled in the art, depending on the construction of the hangers, the clamping members may be urged together in their equilibrium position by spring force means or may be maintained in said equilibrium position by an absence of forces urging them together. In either case, opening the clamping members necessitates applying a force to each clamping member greater than the equilibrium force. Removal of this opening force creates an imbalance whereby the inherent resiliency of the clamping members causes them to close toward the equilibrium position. Obviously, if a garment is inserted between the clamping members they will not be able to return to the equilibrium position (depending upon the thickness of the garment), but will tend to return to that position. The tension created between the clamping members as they tend to resume equilibrium serves to hold the garment therebetween (generally aided by projections on the clamping members).

Non-clamping hangers do not have clamping members and are utilized by merely draping the clothing thereon.

While several different types of clamping hangers are utilized throughout the garment industry, one of the most widely used is a flexible clamping hanger known as a plastic skirt hanger R-8 or R-11 (depending upon size) manufactured by Mr. Hanger, Inc., 20 Jones St., New Rochelle, N.Y. (as well as others). This type of hanger is made of plastic or similar flexible material in a one-piece molded configuration, and has the general appearance of a planar rectangle open along one long side with the hook attached to the other long side (best seen in FIGS. 3A and 3B below). Each short side of this rectangle has paired clamping members molded into it which, in this configuration, comprise a tongue and a tongue frame surrounding the tongue on three sides, the base of the tongue being molded into the skirt hanger and the tongue extending in a direction opposite that of the hook. The tongue and tongue frame clamping members of this type of skirt hanger are normally in equilibrium when nothing is inserted therebetween. As the clamping members are bent or moved apart by a user away from their equilibrium position, thus opening the tongue, the inherent resiliency of the material of which this hanger is made creates forces between a tongue and its corresponding tongue frame, urging them together again. Upon allowing the tongue to tend to resume its normal, equilibrium position, any garment inserted between the tongue and its corresponding tongue frame will be retained by the tension created by the garment being interwoven between said tongue and its corresponding tongue frame. Projections may be molded into the tongues and tongue frames to enhance their ability to hold garments.

No prior art device is known for automatically opening the tongues of such flexible skirt hangers. Accordingly, such skirt hangers have always been used manually to the disadvantage of garment manufacturers and others. The manual use of this type of hanger requires a user to proceed through several time consuming and inefficient manual operations in order to complete the task of securing a garment to the hanger. For example, the user must: (1) get one hanger; (2) place it on a working surface; (3) get the garment to be hung on the hanger; (4) open a first tongue of the hanger with one hand while inserting one side of the garment between the first tongue and its corresponding tongue frame; (5) release the first tongue; (6) open the other, second tongue of the hanger with one hand while inserting the other side of the garment between the second tongue and its corresponding tongue frame; (7) release the second tongue and (8) place the hanger with garment on a rack or other collecting spot. This manual labor requires a considerable amount of time and is therefore inefficient and expensive. Accordingly, it is an object of this invention to provide an apparatus for automatically opening and closing the clamping members of a flexible skirt hanger.

It is a further object of this invention to provide an apparatus for automatically feeding one hanger at a time to a work station where a user may utilize it to hang a garment thereon.

It is yet another object of this invention to provide an apparatus for automatically opening the clamping members of a flexible skirt hanger, enabling a user to insert a garment therebetween, and subsequently closing said clamping members, all operations capable of being performed without the necessity of the user manipulating said clamping members.

SUMMARY OF THE INVENTION

These and other objects of the present invention are achieved by the preferred embodiment disclosed herein. The preferred embodiment selectively and automatically opens and closes the tongues of a flexible skirt hanger as the latter is held at a work station in a frame which limits movement in a first direction of each tongue frame, while enabling movement in a second direction of the base area of each tongue, said second direction being substantially opposite said first direction. Such movement, in conjunction with a pivot point intermediate said base and the tip or end of said tongue frame, imparts a twisting effect to the clamping members of the hanger causing the tongue bases and tongue frame tips to be urged in the same direction which causes the tongues to open in the opposite direction. The activating mechanism which causes the tongues to open consists of a plunger or rod which is pneumatically extended to move the base of each tongue in said second direction. The invention also includes means for automatically feeding a hanger to said work station.

BRIEF DESCRIPTION OF THE DRAWINGS

A better understanding of the present invention as well as additional objects and advantages thereof will become apparent upon consideration of the detailed disclosure thereof which follows, in conjunction with the following drawings, wherein.

DESCRIPTION OF THE PREFERRED EMBODIMENT

Figure 1:
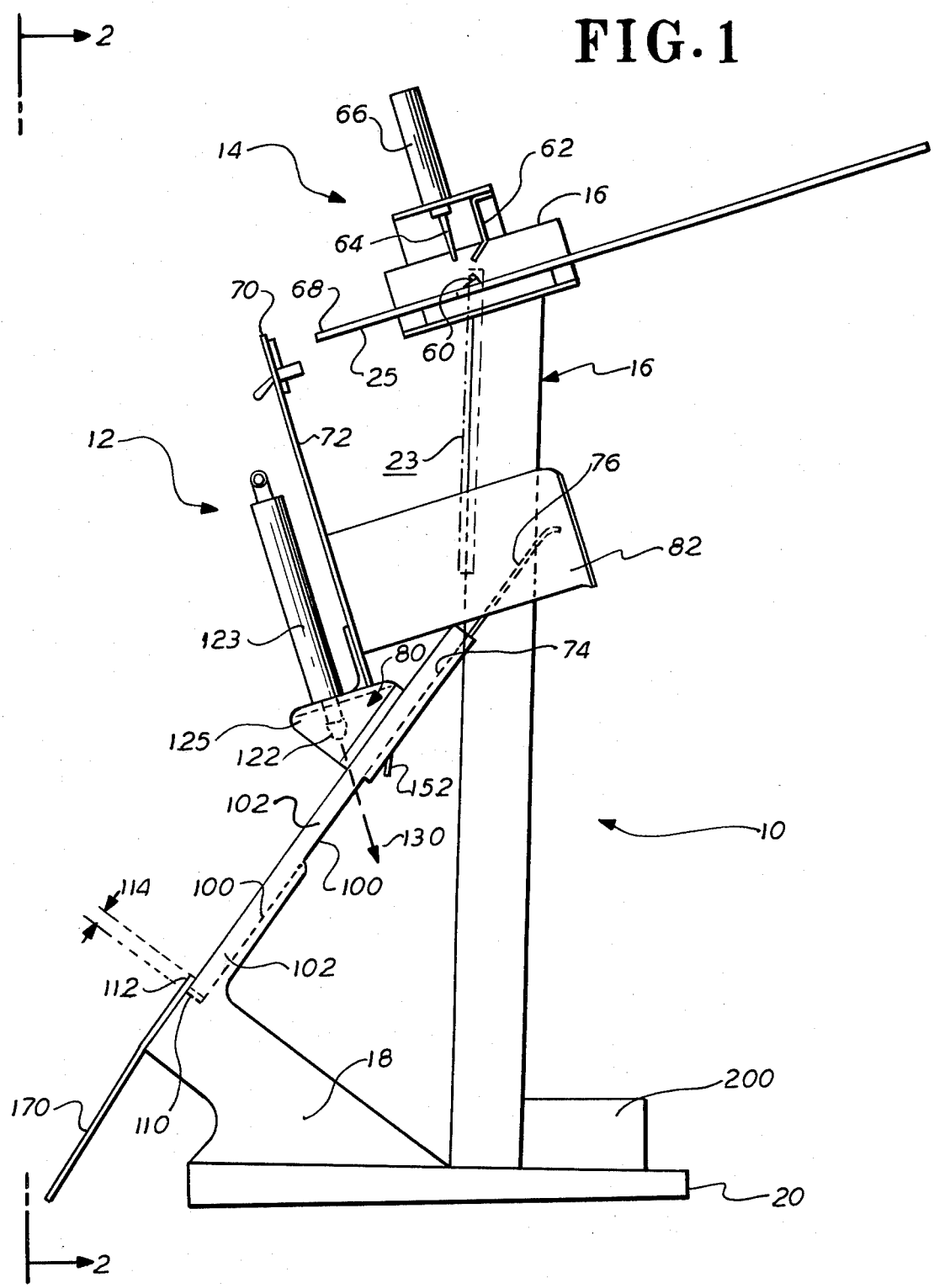
FIG. 1 is a side elevational diagrammatic view, partly in a cross-section, of the preferred embodiment of the invention.

Referring now to FIG. 1, there is shown a side elevational view, partly cross-sectional, of the preferred embodiment of the present invention, generally designated as apparatus 10.

Apparatus 10 includes a work portion 12 and an automatic feeding portion or feeder 14. Work portion 12 is more clearly seen in FIG. 2 which is a front elevational view of FIG. 1 taken along the lines 2—2. Apparatus 10 includes a frame 16 for supporting feeder 14, a frame 18 for supporting work station 12 and a base 20 for holding frames 16 and 18 together in a predetermined orientation. An understanding of the present invention may best be obtained by sequentially describing the operation of the various elements of the invention as it performs its intended function of opening and closing the clamping members of a flexible skirt hanger.

Figure 3A:
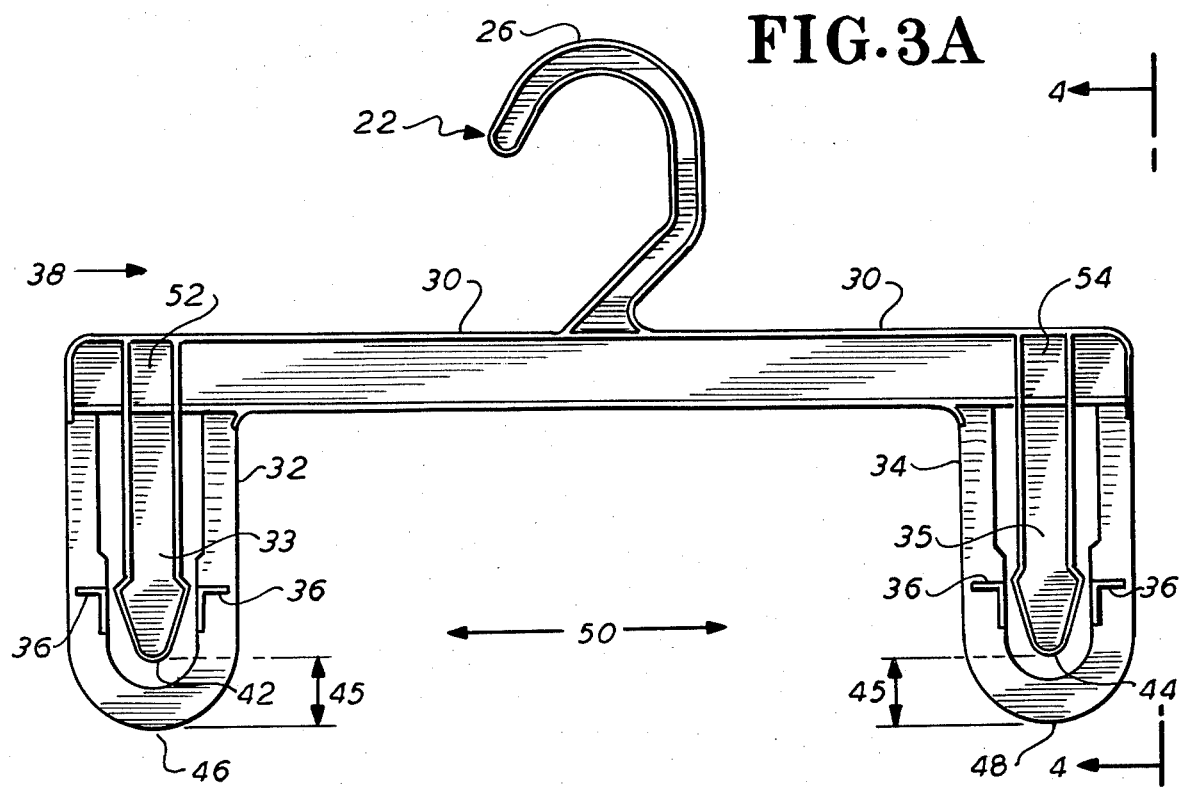
FIG. 3A is a plan view of the front of a skirt hanger for use with the preferred embodiment.
Figure 3B:
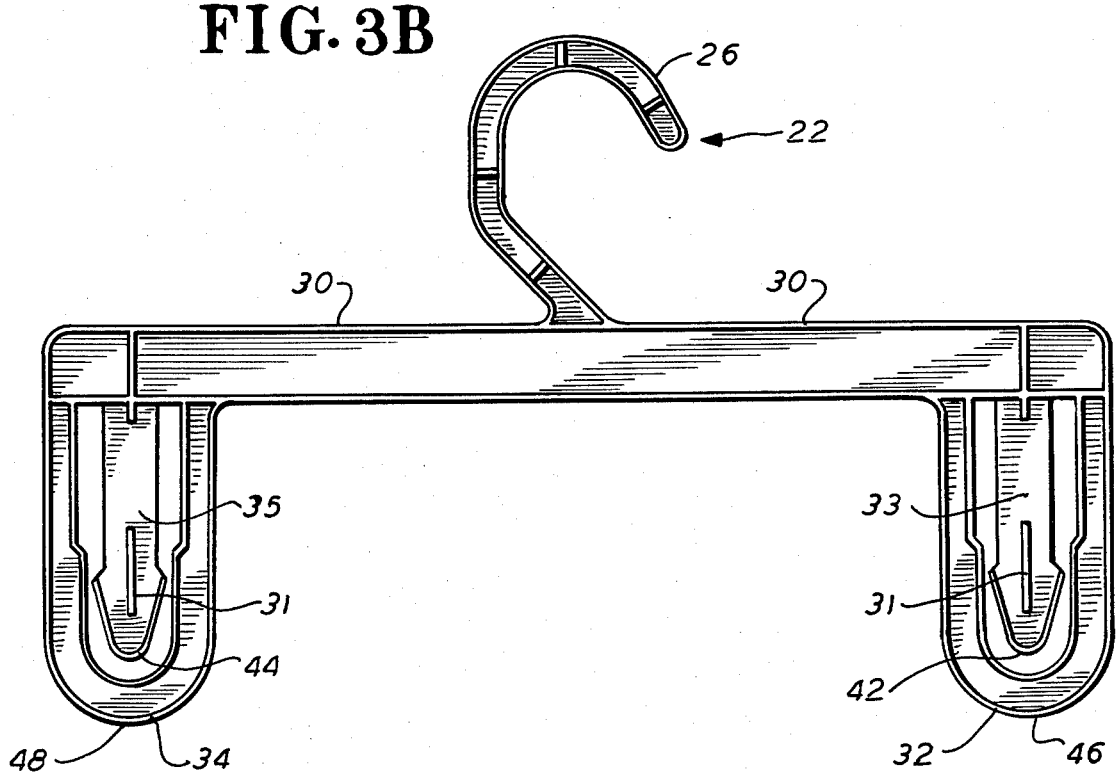
FIG. 3B is a plan view of the back of the hanger shown in FIG. 3A.
Figure 4:
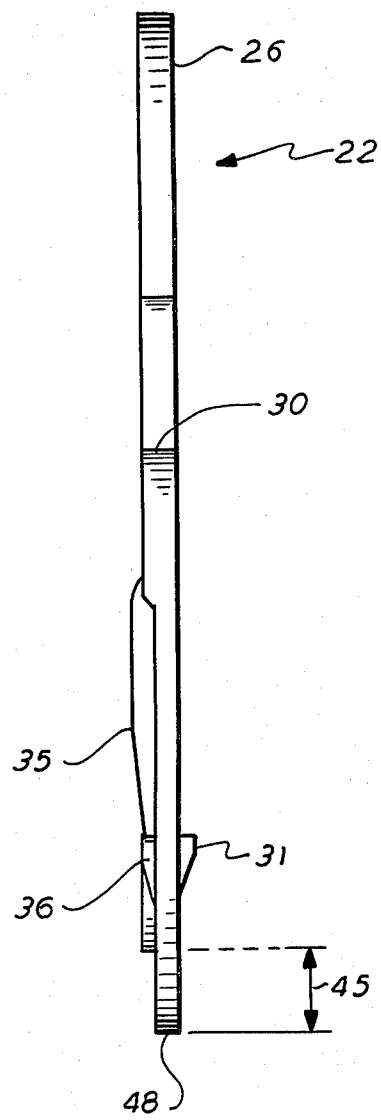
FIG. 4 is a side elevational view of the hanger shown in FIG. 3A taken along the lines 4—4.

Initially, a plurality of skirt hangers 22 is retained on inclined hanger stacking rods 24 and 25. Hanger 22 is relatively thin and substantially planar as is shown in FIGS. 3A, 3B and 4 and includes a hook 26, crossbar 30, left and right tongue frames 32 and 34, respectively, and left and right tongues 33 and 35, respectively associated therewith. Hook 26 and crossbar 30 generally identify the top 38 of hanger 22, and the left and right tongue tips 42 and 44 respectively, along with the left and right tongue frame tip portions 46 and 48 respectively, generally identify the bottom 50 of hanger 22. Each tongue tip is situated at a distance 45 from the farthest point of its respective tongue frame.

Figure 5:
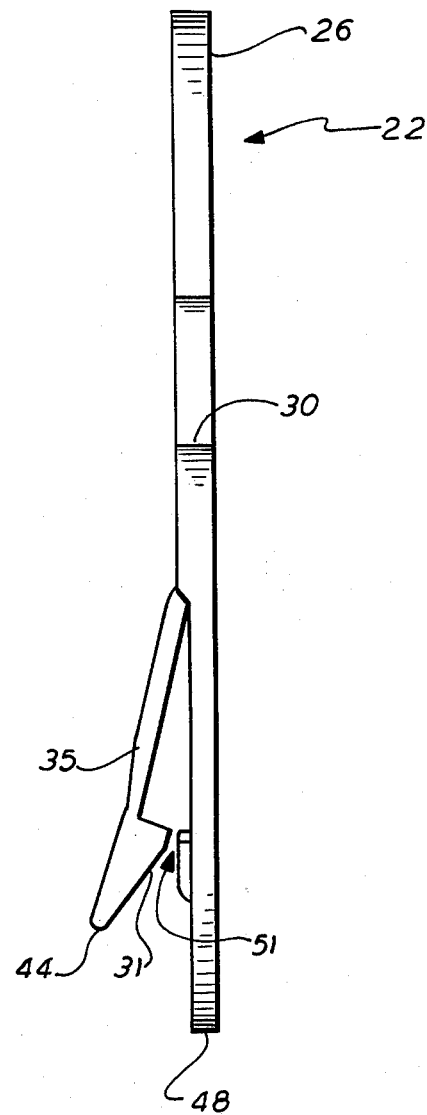
FIG. 5 is a side elevational view of the hanger shown in FIG. 3A showing the tongue in an open position.

Hanger 22 is generally constructed of one-piece, molded pliable plastic or other similarly flexible material and is sufficiently flexible to enable tongue tips 42 and 44 to be bent away from respective tongue frame tips 46 and 48 as is best seen in FIG. 5, thus creating a space 51 therebetween for the insertion of clothing or other material to be hung on the hanger. Tongues and tongue frames may have projections 31 and 36, respectively, molded therein to enhance the gripping operation thereof. Tongues 33 and 35 have base areas 52 and 54 respectively where the tongues join crossbar 30.

Figure 2:
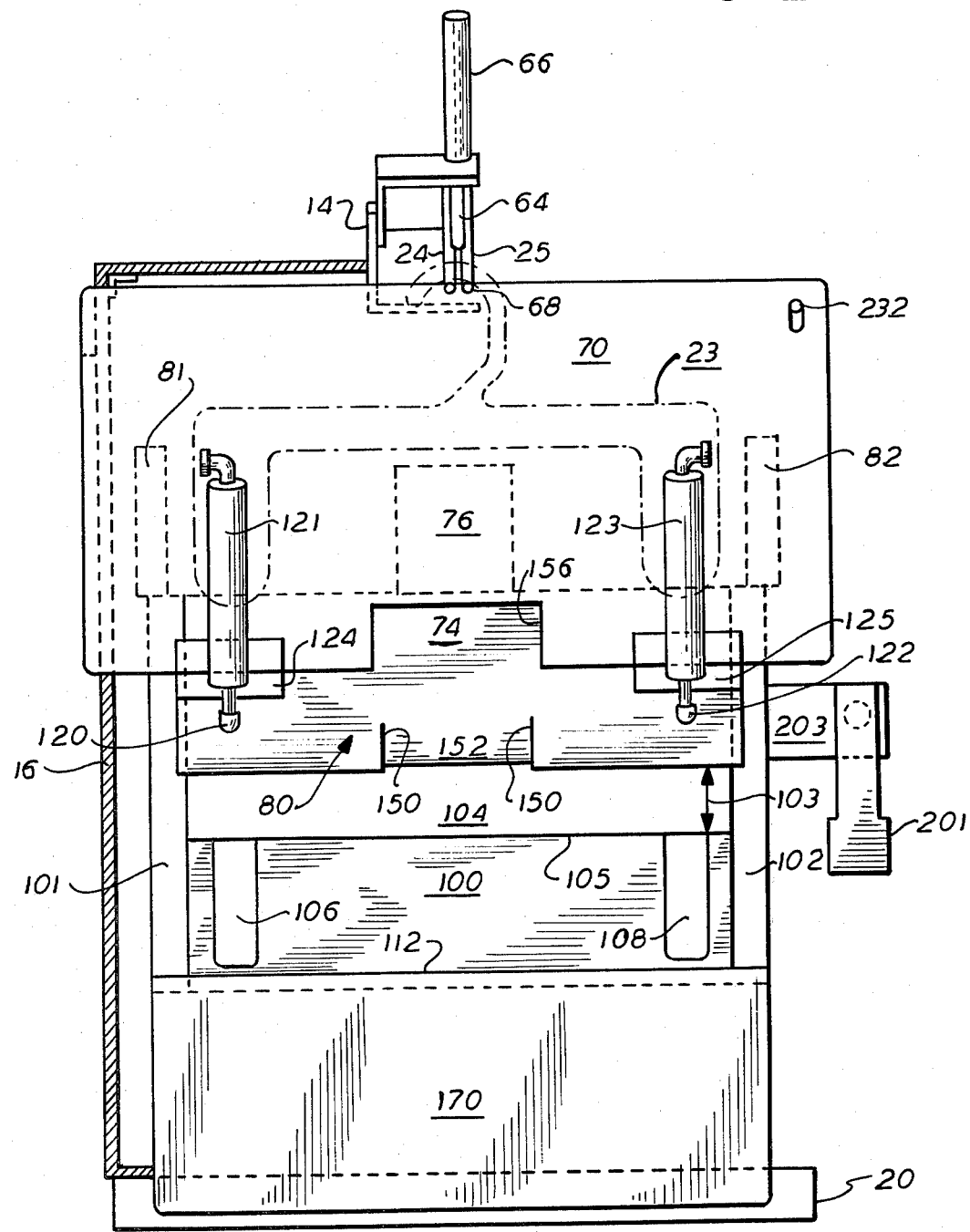
FIG. 2 is a front elevational view of FIG. 1 taken along the line 2—2.

For clarity, FIGS. 1 and 2 depict only one such hanger 23 in phantom (identical to hangers 22 but differentiated therefrom by being the hanger to slide past feeder 14 in any one cycle) supported by rods 24 and 25, but it will be understood that a plurality of similar hangers may be supported (in storage) behind hanger 23, extending upwardly along rods 24 and 25. Rods 24 and 25 are inclined sufficiently to cause hangers 22 to slide downwardly thereon in response to gravitational forces. Hangers 22 are inhibited in their slide along rods 24 and 25 by stop member 60 and retaining spring 62 which cooperate to hold back all hangers 22 while selectively permitting hanger 23 to slide past stop member 60.

Stop member 60 is held in the raised position shown in FIG. 2 by a spring (not shown) and may be depressed by plunger or rod 64 in order to permit one hanger (23) to slide past stop member 60. Rod 64 is activated by a double-action air cylinder 66 (by pneumatic means more fully explained below) which selectively causes rod 64 to be extended sufficiently to depress stop member 60 and subsequently to be retracted to allow member 60 to rise to assist spring 62 in holding the remaining hangers 22 stacked on rods 24 and 25.

After being released by stop member 60, hanger 23 will slide to and off the bottom end 68 of rods 24 and 25 and will hit stop plate 70 which is oriented generally perpendicular to rods 24 and 25. Hanger 23 will hit the back 72 of stop plate 70 and slide downwardly thereon until it hits slide ramp 74 along approximately the line of intersection (not shown) of slide ramp 74 and the plane of stop plate 70. Slide ramp 74 and stop plate 70 are separated by space 80 having a predetermined size sufficient to let hanger 23 pass therethrough, as will be more fully explained below.

The inertia of hanger 23 prior to its impact with slide ramp 74 causes hanger 23 to fall away from back surface 72 and on to spring steel plate 76 attached to the top end of slide ramp 74. Also, space 80 is sufficiently large to facilitate hanger 23 falling away from back surface 72. That is, as hanger 23 falls on to slide ramp 74 the tongue frame tips 46 and 48 are the first parts of the hanger to touch the ramp. Hanger 23 momentarily stays in this position (with only tips 46 and 48 touching ramp 74 and a certain portion of hanger 23 remaining against back surface 72) until the weight of bottom portion 50 of hanger 23 causes tips 46 and 48 to start to fall through space 80. Spring 76 serves to "bounce" the hook 26 and top end 38 of hanger 23 upwardly (after hanger 23 falls) thereby causing the bottom end 50 of hanger 23 to move downwardly to assure that bottom end 50 will easily pass through space 80 and under lip 112 as will be understood below. Left and right lateral brackets 81 and 82 serve to limit the lateral motion of hanger 23 to facilitate its subsequent positioning as will be understood below. As hanger 23 slides downwardly along slide ramp 74 it will pass toward work portion 12, the configuration of which may best be understood by reference to FIG. 2.

Hanger 23 slides down slide ramp 74 and onto work station ramp 100 aligned therewith and spaced apart therefrom by a predetermined distance 103 to form aperture 104 therebetween. Ramps 74 and 100 are held together in proper spatial relationship by left and right lateral guides 101 and 102, respectively, which are raised above the surfaces of ramps 74 and 100 to enable the guides to also serve to maintain hanger 23 within a predetermined area in order to position hanger 23 into a work station, as will be more fully explained below. Ramp 100 is provided with left and right grooves or channels, 106 and 108 respectively. These channels are positioned so as to enable hanger 23 to slide smoothly from ramp 74 to ramp 100 in the event tongues 33 and 35 have projections 31 thereon as shown in FIGS. 4 and 5. Such projections might, without use of channels 106 and 108, hit the top edge 105 of ramp 100 (as hanger 23 slides down) which might either stop the downward slide of hanger 23 or cause bottom end 50 of hanger 23 to bounce upwardly which may in turn prevent hanger 23 from coming to rest against stop surface 110 (as will be understood more clearly below).

Figure 6:
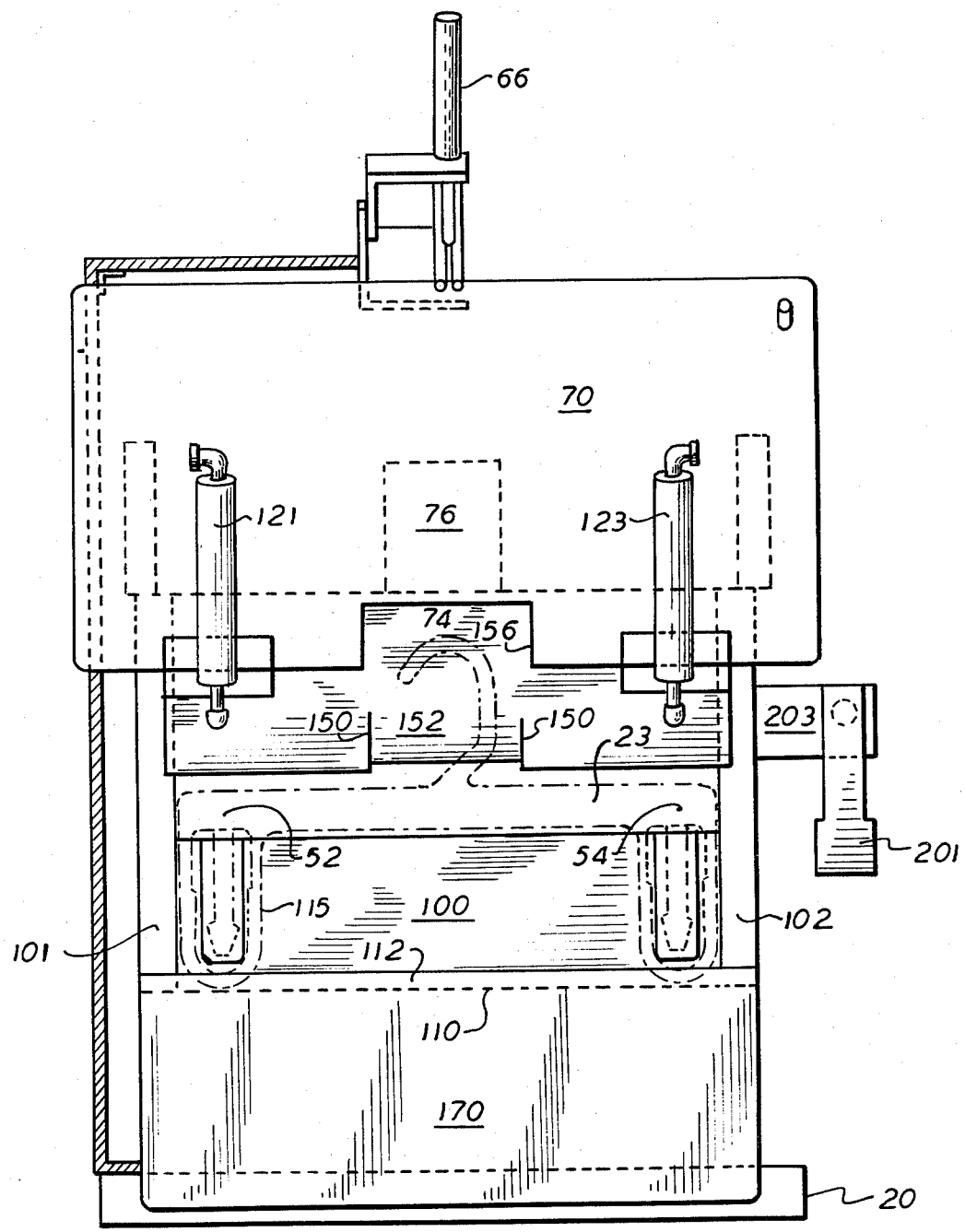
FIG. 6 is a view of FIG. 2 showing the hanger of FIGS. 3A and 3B at rest at the work station of the preferred embodiment.
Figure 7:
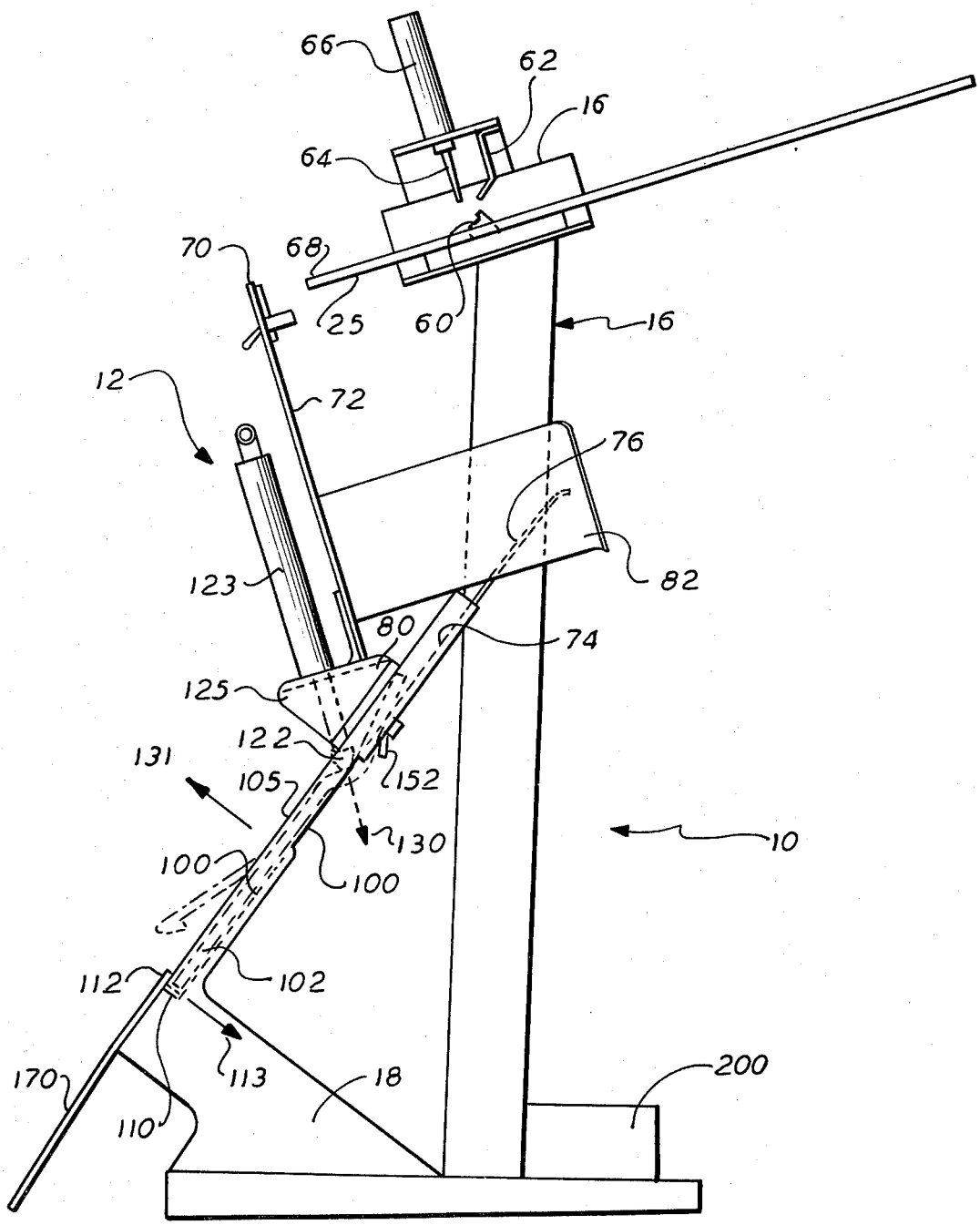
FIG. 7 is a view of FIG. 1 showing the hanger of FIGS. 3A and 3B in the work station in the tongue-open position.

As hanger 23 slides down ramp 74 its downward slide will be stopped by stop surface 110 which is perpendicular to ramp 100. Retaining lip 112 extends upwardly from stop surface 110 and parallel to ramp 100. Lip 112 has a predetermined width 114 which, as will be more fully understood below, must be less than distance 45. As hanger 23 comes to rest against surface 110, as shown in FIGS. 6 and 7, the tip portions of the tongue frame will rest behind lip 112. The position at which hanger 23 comes to rest as shown in FIG. 6 may be termed work station 115 since additional operations will be performed upon hanger 23 by apparatus 10 while hanger 23 is held in work station 115. These additional operations and the elements of the invention performing same are explained below.

As shown in FIGS. 1 and 2, single action air cylinders 121 and 123 are secured in a predetermined orientation to frame 18 and stop plate 70 by suitable brackets 124 and 125 respectively. After hanger 23 comes to rest at work station 115 and against stop surface 110, rod plungers 120 and 122 of cylinders 121 and 123 respectively, will be situated over tongue base portions 52 and 54 respectively (as best seen in FIGS. 6 and 7). Upon selective activation of cylinders 121 and 123, rods 120 and 122 will be extended a predetermined distance in direction 130 and will cause base portions 52 and 54 and crossbar 30 respectively to move in first direction 130 a predetermined amount. This action will necessarily urge hanger 23 to pivot clockwise (as viewed) on ramp 100 since aperture 104 does not inhibit motion of crossbar 30. However, lip 112, by virtue of its size, resists such pivoting of the tongue frame tip portions 46 and 48 while not inhibiting the clockwise motion of tongues 33 and 35. Lip 112 essentially exerts a force upon tongue frame tips 46 and 48 in second direction 113 (as seen in FIG. 7) which is substantially parallel to direction 130. Pivot edge 105 essentially exerts a force on the tongue frames in a third direction 131 substantially opposite directions 113 and 130. Consequently, a twisting effect will be imparted to each pair of clamping members causing tongues 33 and 35 to open from their respective tongue frames 46 and 48, thereby enabling a user to insert a garment between each respective pair of these clamping members. Front apron 170 facilitates guiding a garment into the opening between the clamping members.

Referring again to FIGS. 1, 2, 6 and 7 there are shown slits 150 having a bent tab 152 therebetween. Bent tab 152 enables movement of hook 26 into the area that would have been occupied by the tab had it not been bent, thus enabling hanger 23 to be bent sufficiently to open the tongues, as will be more fully understood below. Furthermore, cut-out aperture 156 is also provided in stop plate 70 in order to facilitate removal of hanger 23 from work station 115 by not impeding movement of hook 26 by a user.

Cylinders 121 and 123 are purely conventional single action pneumatically driven air cylinders which pneumatically extend rods 120 and 122 and subsequently retract same by means of springs (not shown) when the pneumatic excitation is removed. Those skilled in the art will realize that double action air cylinders may be used if desired, thus effecting a more positive retraction of the rods. In the preferred embodiment disclosed herein the retraction of rods 120 and 122 removes the twisting forces imparted to the pairs of clamping members and enables tongues 33 and 35 to resume their natural tendency toward equilibrium adjacent their respective tongue frames. This action introduces tension in any garment inserted between the clamping members which secures the garment to hanger 23 in a manner well known to those skilled in the art.

Figure 8:
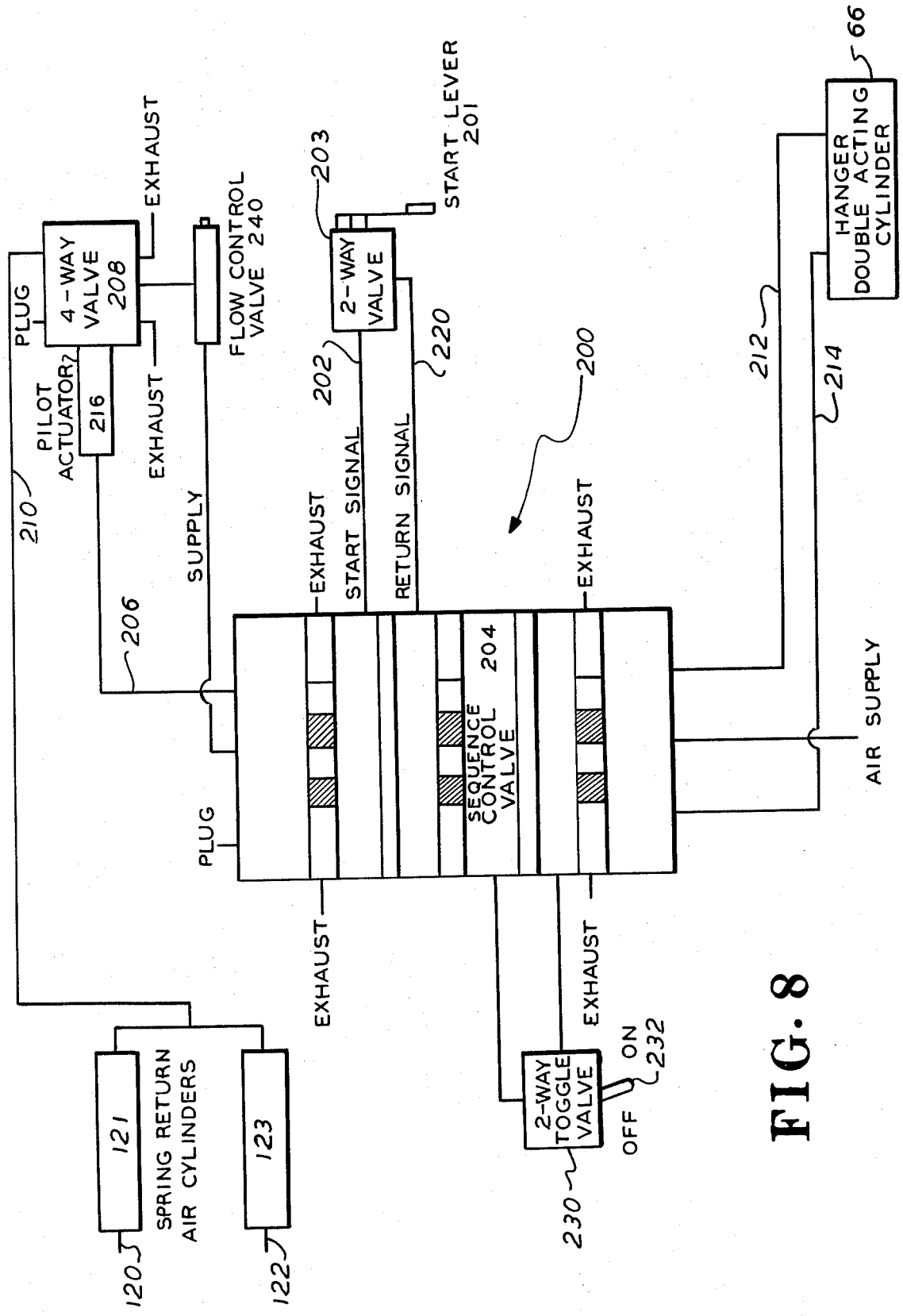
FIG. 8 is a schematic diagram of the pneumatic control system utilized in the preferred embodiment.

Air cylinders 66, 121 and 123 are all activated by a pneumatic control system schematically shown in FIG. 8 and designated 200. Pneumatic system 200 is a combination of conventional pneumatic devices arranged in a manner which will cause said air cylinders to be activated in a predetermined sequence. (For clarity, the pneumatic lines connecting various elements are omitted from the Figures). An understanding of the operation of pneumatic system 200 may best be obtained by describing one cycle of operation which is initiated by depression of starting lever 201.

When starting lever 201 (also seen in FIGS. 1 and 6) is activated by a user, pneumatic line 202 is pressurized causing the spools (not shown) in the sequence control valve 204 to shift in a manner well known to those skilled in the art. This action allows line 206 to exhaust through sequence control valve 204 which in turn permits the spools (not shown) in the 4-way valve 208 to shift thereby exhausting line 210 through the 4-way valve 208. This action causes the spring return rods 120 and 122 to retract.

When rods 120 and 122 are fully retracted, the spools in sequence control valve 204 again shift exhausting line 212 and pressurizing line 214. This action causes the double acting cylinder 66 to retract, thereby permitting one hanger to slide along rods 24 and 25 toward work portion 12.

When cylinder 66 is fully retracted, the spools in sequence control valve 204 shift, exhausting line 214 and pressurizing line 212 thereby forcing double acting cylinder 66 to extend, thereby preventing any more hangers from sliding down rods 24 and 25.

When double acting cylinder 66 is fully extended, the spools in sequence control valve 204 against shift pressurizing line 206 to the pilot actuator 216 of 4-way valve 208, shifting the spools therein. This in turn pressurizes line 210 which extends the spring return rods 120 and 122. When rods 120 and 122 are fully extended the spools in sequence control valve 204 are again shifted directing the air flow to line 220 back to the lever activated 2-way valve 203 which completes the cycle.

Two-way toggle valve 230 and the 2-way lever 232 are similar to valve 203 and are primarily safety devices. When 2-way toggle valve 230 is in the "on" position the operation proceeds as above. When valve 230 is in the "hold" position spring return rods 120 and 122 are retracted and held in the retracted position for the purpose of clearing any hanger which may have jammed. After the device is cleared 2-way toggle valve 230 may be switched to the "on" position in order to allow automatic completion of the cycle.

Flow control valve 240 is an adjustable valve which controls air flow within pneumatic system 200 and permits adjustment of the speed with which the various rods are extended and retracted. Such adjustment also controls various time intervals of operation as will be more fully understood by reference to the timing diagram shown in FIG. 9.

Figure 9:
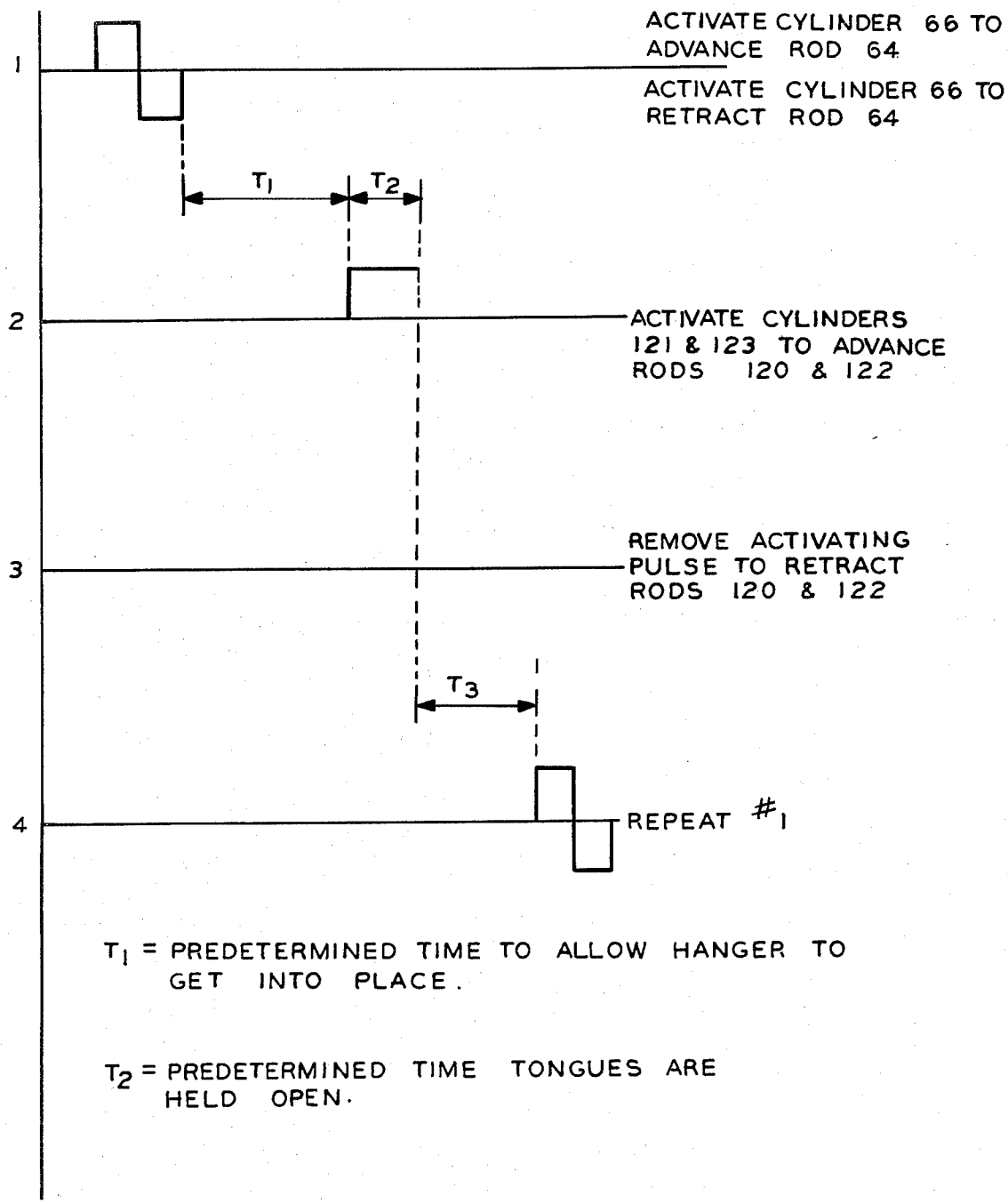
FIG. 9 is a timing diagram showing the sequence of events in the preferred embodiment.

The time period $T_1$ shown in FIG. 9 is the time delay between the retraction of rod 64 which causes hanger 23 to be "fed" from feeder 14 into work portion 12 and the time at which rods 120 and 122 are extended to open tongues 33 and 35. Time $T_1$ is a function of how long it takes hanger 23 to come to rest at the work station and this delay may be incorporated into pneumatic system 200 by purely conventional means. Time period $T_2$ is the time during which the tongues are held open for use by a user. Time period $T_3$ is the time delay between the retraction of rods 120 and 122 and the beginning of the next cycle by feeding the next hanger. Time $T_3$ permits a user to remove a hanger with a garment hung thereon from apparatus 10. These time delays $T_2$ and $T_3$ are a function of how fast a particular user may be able to use apparatus 10 and may also be set by purely conventional means. In the preferred embodiment disclosed herein time $T_3$ is set by the user who must depress lever 201 to initiate each cycle. However, those skilled in the art will understand that the operation of apparatus 10 could be automatically cyclic with various predetermined time periods $T_1$, $T_2$ and $T_3$ automatically incorporated into apparatus 10.

Those skilled in the art will realize that numerous other modifications and improvements may be made on the preferred embodiment of the invention disclosed herein without departing from the spirit and scope thereof.

What is claimed is:

1. An apparatus for opening the clamping members of a clothing hanger to enable a user to insert a garment between said clamping members and for subsequently closing said clamping members, comprising:
   means for holding said hanger in substantially a predetermined position;
   means secured to said holding means for opening said clamping members to enable said garment to be inserted therebetween while said hanger is held in said predetermined position;
   means secured to said holding means for closing said clamping members whereby any garment inserted therebetween will be clamped therebetween.

2. An apparatus according to claim 1 wherein said opening means is a pneumatically extended rod.

3. An apparatus according to claim 2 wherein said closing means is a spring for retracting said rod.

4. An apparatus for opening the tongue of a substantially planar flexible skirt hanger to enable said hanger to receive a garment between said tongue and the corresponding tongue frame adjacent said tongue, and for subsequently closing said tongue comprising:
   a frame for holding said hanger in substantially a predetermined position during a predetermined work operation on said hanger;
   means secured to said frame for moving the base of said tongue a predetermined distance in a first direction, said first direction being substantially perpendicular to the plane of said hanger;
   pivot means secured to said frame intermediate said base and the tip of said tongue for urging said hanger to pivot thereabout in response to movement of said tongue base in said first direction thereby causing said tongue and said tongue frame to pivot about said pivot means;
   means for inhibiting the pivoting of said tongue frame about said pivot means, whereby said tongue will be caused to open from said tongue frame to enable insertion of said garment therebetween; and
   means for closing said tongue, whereupon said tongue will be closed upon any garment inserted between said tongue and said tongue frame.

5. An apparatus for opening the tongue of a substantially planar flexible skirt hanger to enable said hanger to receive a garment between said tongue and the corresponding tongue frame adjacent said tongue and for subsequently closing said tongue comprising:
   a frame for holding said hanger in substantially a predetermined position during a predetermined work operation on said hanger;
   means for rotating said tongue and its corresponding tongue frame in a predetermined first rotational direction, said first rotational direction being in a plane perpendicular to the plane of said hanger;
   means for inhibiting rotation of said tongue frame in said first rotational direction beyond a predetermined position;
   whereby upon a predetermined amount of rotation of said tongue in said first rotational direction said tongue will open away from said tongue frame to enable said garment to be inserted therebetween; and
   means for closing said tongue whereupon said tongue will be closed upon any garment inserted between said tongue and said tongue frame.

* * * * *